United States Patent [19]
Jarocki

[11] Patent Number: 5,611,937
[45] Date of Patent: Mar. 18, 1997

[54] WATER TREATING APPARATUS AND METHOD

[75] Inventor: George J. Jarocki, Atlanta, Ga.

[73] Assignee: The Coca-Cola Company, Atlanta, Ga.

[21] Appl. No.: 440,058

[22] Filed: May 12, 1995

[51] Int. Cl.$^6$ ................................................. B01D 35/30
[52] U.S. Cl. ............................ 210/754; 210/764; 210/87; 210/206; 220/640
[58] Field of Search ........................... 210/754, 764, 210/85, 87, 205, 206; 222/640, 146.6, 190

[56] References Cited

U.S. PATENT DOCUMENTS

| | | |
|---|---|---|
| 830,552 | 9/1906 | Zeigler . |
| 1,500,283 | 7/1924 | Stinson . |
| 2,094,778 | 10/1937 | Alexander . |
| 2,339,640 | 1/1944 | Holinger . |
| 2,447,511 | 8/1948 | Leaf . |
| 2,732,069 | 1/1956 | Henderson . |
| 2,999,797 | 9/1961 | Campbell . |
| 3,043,433 | 7/1962 | Singer . |
| 3,248,098 | 4/1966 | Cornelius . |
| 3,621,865 | 11/1971 | Baggaley . |
| 3,759,387 | 9/1973 | Drayton, Jr. . |
| 3,774,768 | 11/1973 | Turner . |
| 3,865,126 | 2/1975 | Baggaley . |
| 3,943,261 | 3/1976 | Amon et al. . |
| 4,006,752 | 2/1977 | De Vale . |
| 4,202,768 | 5/1980 | De Longe et al. . |
| 4,215,128 | 7/1980 | Neeser ........................... 137/113 |
| 4,314,906 | 2/1982 | Dunn et al. . |
| 4,435,291 | 3/1984 | Matsko . |
| 4,507,253 | 3/1985 | Wiesmann . |
| 4,554,939 | 11/1985 | Kern et al. . |
| 4,844,796 | 7/1989 | Plester ........................... 210/264 |
| 5,096,589 | 3/1992 | Blind et al. . |

FOREIGN PATENT DOCUMENTS 740843 11/1943 Germany .

Primary Examiner—W. L. Walker
Attorney, Agent, or Firm—Birch, Stewart, Kolasch & Birch, LLP

[57] ABSTRACT

A method and apparatus for treating water in which water from a local supply is mixed with measured quantities of a chlorine disinfectant and introduced into a holding vessel maintained at ambient pressure. $CO_2$ added to the holding tank enhances the potency of the disinfectant with a resultant effective destruction of micro-organisms in the water. From the holding vessel, the disinfected water is conducted to a point of use, which may be a pressurized carbonator incorporated into a post-mix beverage dispenser. A treating module governed by a microprocessor effects the mixing of disinfectant and water and controls the introduction of water with entrained disinfectant into the holding vessel.

20 Claims, 3 Drawing Sheets

WATER TREATING APPARATUS AND METHOD

BACKGROUND OF THE INVENTION

The present invention relates to an apparatus and a method for treating water to enhance its suitability for human consumption. More particularly the present invention relates to such an apparatus and method for treating water supplied to a post-mix beverage dispenser.

U.S. Pat. No. 3,943,261 which issued to Amon et al. discloses a water treating system which has proved to be effective for disinfecting water supplied to a post-mix beverage dispenser. However, this system cannot be conveniently employed where the pressure of supplied water is low and is not suitable for use with newer post-mix dispensers which incorporate an integral carbonator. In the Amon et al. system, water with entrained chlorine disinfectant is introduced into a carbonating vessel where destruction of pathogenic micro-organisms occurs. Typically, an elevated pressure is maintained within the carbonating vessel. To withstand the pressure, the vessel must be of fairly robust and expensive construction. The pressure in the carbonating vessel impedes the admission of water into the vessel, so the incoming water must be supplied at a pressure which exceeds the pressure in the vessel. For adding proportioned quantities of disinfectant to the water, the Amon et al. system employs an injector which aspirates the disinfectant into water circulated by a carbonator pump.

The limitations of known water treating systems, establish a need in the industry for a water treating system which reliably produces water with enhanced suitability for human consumption, especially in beverages produced in a post-mix dispenser, is of relatively simple and inexpensive construction and may be conveniently used with water supplies of considerably different sophistication.

OBJECTS OF THE INVENTION

It is object of the present invention to provide a water treating apparatus and method in which a treating module performs the functions of injecting positively metered quantities of disinfectant into supplied water and controlling the flow of water with entrained disinfectant into a holding vessel where destruction of pathogenic micro-organisms occurs.

It is another object of the present invention to provide a water treating apparatus and method in which the interior of a holding vessel receiving water with entrained disinfectant and gaseous $CO_2$ is maintained at ambient pressure.

It is another object of the present invention to provide a water treating apparatus and method which may be conveniently used with a post-mix beverage dispenser incorporating a carbonating vessel operating with an elevated internal pressure.

SUMMARY OF THE INVENTION

The foregoing objects of the invention, and others as well, are realized by a water treating apparatus comprising: a treating module incorporating a water supply port, a water discharge port, a first flow passage extending between the water supply port and the water outlet port, a flow sensor and a valve disposed in the first flow passage, a treating agent inlet, a second flow passage extending between the treating agent inlet and the first flow passage and a pump for moving a treating agent supplied to the treating agent inlet through the second passage into the first passage; a holding vessel incorporating a water inlet coupled to the water outlet port of the treating module, a water outlet and a water level sensor; and control means for (1) operating the pump in response to signals generated by the flow sensor and (2) operating the valve in response to signals generated by the water level sensor.

The objects of the invention are further realized by a method of preparing water for human consumption as a potable liquid or as a component of a beverage formed from a mixture of the prepared water and a beverage syrup, the method comprising the steps of: adding a disinfecting agent to water flowing into a first vessel maintained at a first internal pressure; mixing gaseous $CO_2$ with the water in the first vessel; conducting the water in the first vessel to a second vessel maintained at a second internal pressure which is different from the first pressure; and mixing gaseous $CO_2$ with the water in the second vessel.

The objects of the invention are still further realized by a method of preparing and supplying water to a mixing and dispensing nozzle in a post-mix beverage dispenser, the method comprising the steps of: mixing gaseous $CO_2$ with water in a first vessel maintained at a first internal pressure; conducting the water from the first vessel to a second vessel maintained at a second internal pressure which is different from the first pressure; mixing gaseous $CO_2$ with the water in the second vessel; and conducting the water in the second vessel to the mixing and dispensing nozzle.

The detailed description which follows will reveal the further scope of the present invention. However, it should be understood that the specific examples described are illustrative only, and various changes and modifications within the spirit and scope of the invention may become apparent to persons skilled in the art who have had the benefit of this disclosure.

DESCRIPTION OF THE PREFERRED EMBODIMENTS

Figure 1:
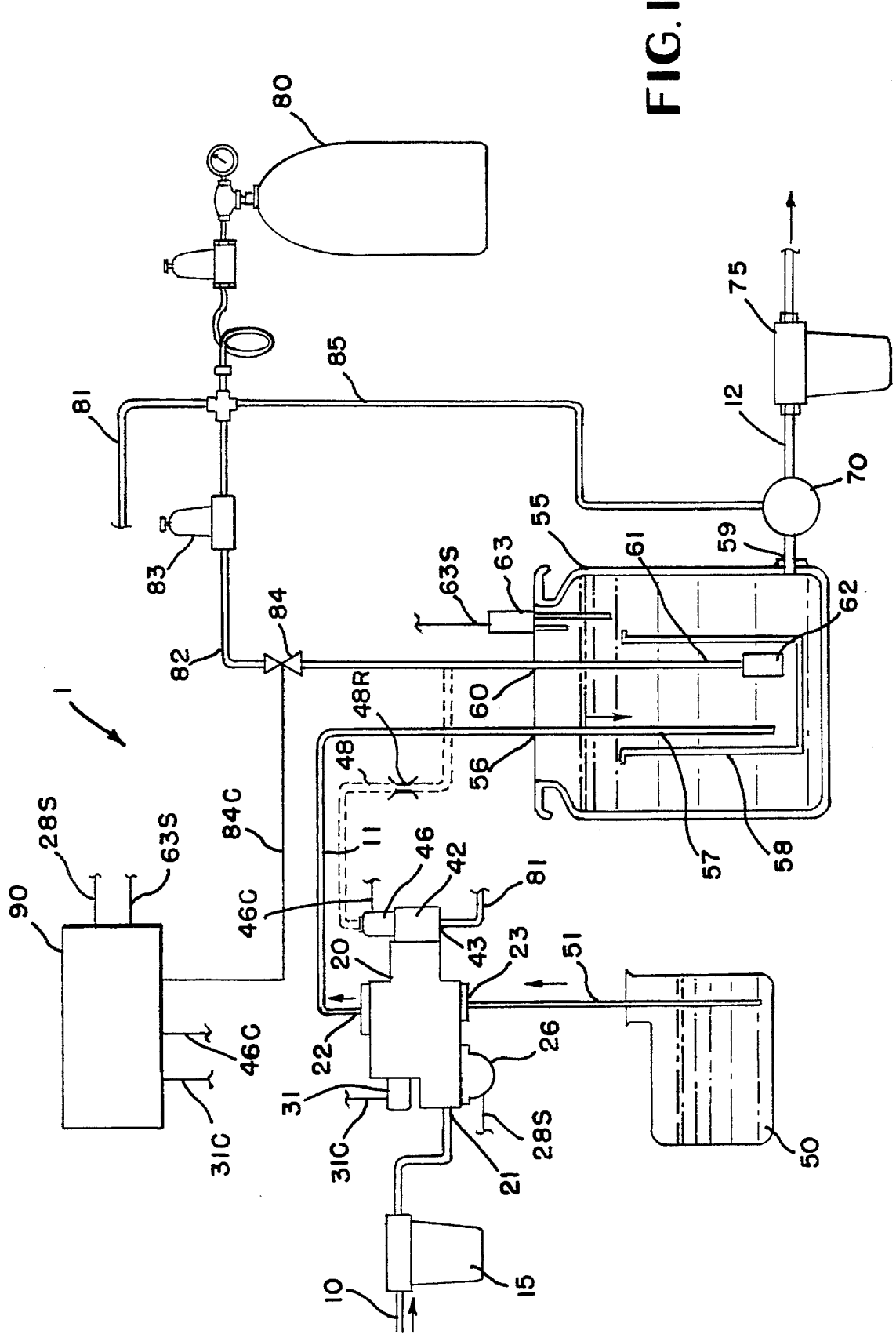
FIG. 1 is a schematic illustration of a preferred embodiment of the water treating apparatus of the present invention.

As illustrated schematically in FIG. 1, a preferred embodiment of the water treating apparatus of the present invention comprises a water inlet 10 receiving water from a local water supply. The water passes through a filter 15 incorporating a filtration medium designed for the removal of particulates from the water. From filter 15, the water enters a treating module 20 through water inlet 21. As will be described in detail hereafter, a disinfectant, supplied from reservoir 50 through conduit 51, is added to the water as it passes through the treating module. A disinfectant which has been found to be particularly effective is a 1,200–1,500 ppm (parts per million) solution of sodium hypochlorite which is easily prepared by diluting a 5.25% (or 52,500 ppm) sodium hypochlorite solution, commonly available as household laundry bleach. This disinfectant is further diluted in the treating module so that the disinfectant concentration in the water discharged from the treating module is approximately 2.5 to 3 ppm.

The water with entrained disinfectant passes from the water outlet 22 of the treating module through a conduit 11 to the water inlet 56 of a holding vessel 55. To minimize the turbulence of the incoming flow, a water inlet tube 57 directs the water within the lower region of an entrance chamber 58 submerged within the holding vessel. Gaseous $CO_2$ is introduced into the water in the holding vessel through a bubble diffuser 62 disposed at the lower region of the entrance chamber. $CO_2$ at a regulated pressure may be conveniently supplied to the $CO_2$ inlet 60 of the holding vessel from a bottle 80 through conduit 82. A pressure regulator 83 may be disposed in conduit 83 in addition to, or instead of, the pressure regulator commonly fitted to the $CO_2$ bottle. Fitted to the holding vessel is a level sensor assembly 63. The illustrated level sensor employs probes terminating at different levels, but other level sensors, such as those employing a float, could be used instead. The holding vessel is normally exposed to ambient temperature and is vented so that ambient pressure is maintained within. Relatively inexpensive materials, including plastics, will suffice for construction of the holding vessel.

Within the holding vessel, pathogenic micro-organisms such as viruses and bacteria in the water are destroyed by the disinfectant. As disclosed in the Amon et al. patent cited earlier, the potency of a chlorine disinfectant against these micro-organisms is enhanced by reducing the pH of the water. In the illustrated embodiment of the present invention, the pH reduction is effected by introducing gaseous $CO_2$ into the water within the holding vessel. The $CO_2$ which dissolves in the water will reduce the pH to a value between 5.2 and 6.2, depending on the alkalinity and temperature of the water supplied at inlet 10 to the water treating apparatus. Because the holding vessel is vented, gaseous $CO_2$ which does not dissolve in the water can escape to the atmosphere. In addition, the internal pressure within the holding vessel does not impede the flow of water into the vessel, so the pressure of the incoming water need not be elevated. The size of the holding vessel is dictated in part by the volume of treated water required and by the need to expose the micro-organisms to the disinfectant for a period which is sufficient to effect a complete destruction of the micro-organisms.

Figure 1A:
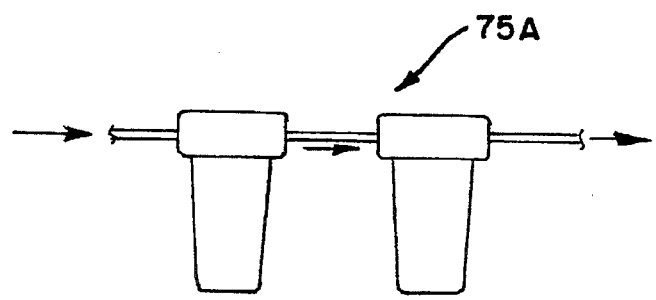
FIG. 1A is a schematic illustration of an alternative filtration assembly which may be employed in the water treating apparatus of FIG. 1.

A filter 75 disposed in conduit 12 receives disinfected water drawn from the outlet 59 of the holding vessel by a pump 70. Filter 75 incorporates a fine filtration medium capable of trapping parasitic cysts carried in the water. The filtration medium 75 may, for example, be a 0.5 micron carbon block filter which removes the parasitic cysts as well as the residual disinfectant and its objectionable odor and taste. A filter arrangement 75A illustrated in FIG. 1A, which may used in place of the single filter 75, could include a filter designed for removal of parasitic cysts followed by a granulated carbon filter for removal of the residual disinfectant. Pump 70 may be operated by pressurized $CO_2$ gas supplied from bottle 80 through conduit 85, as shown, and may be controlled by the demand of an apparatus, such as a post-mix beverage dispenser, receiving the treated water.

Figure 2:
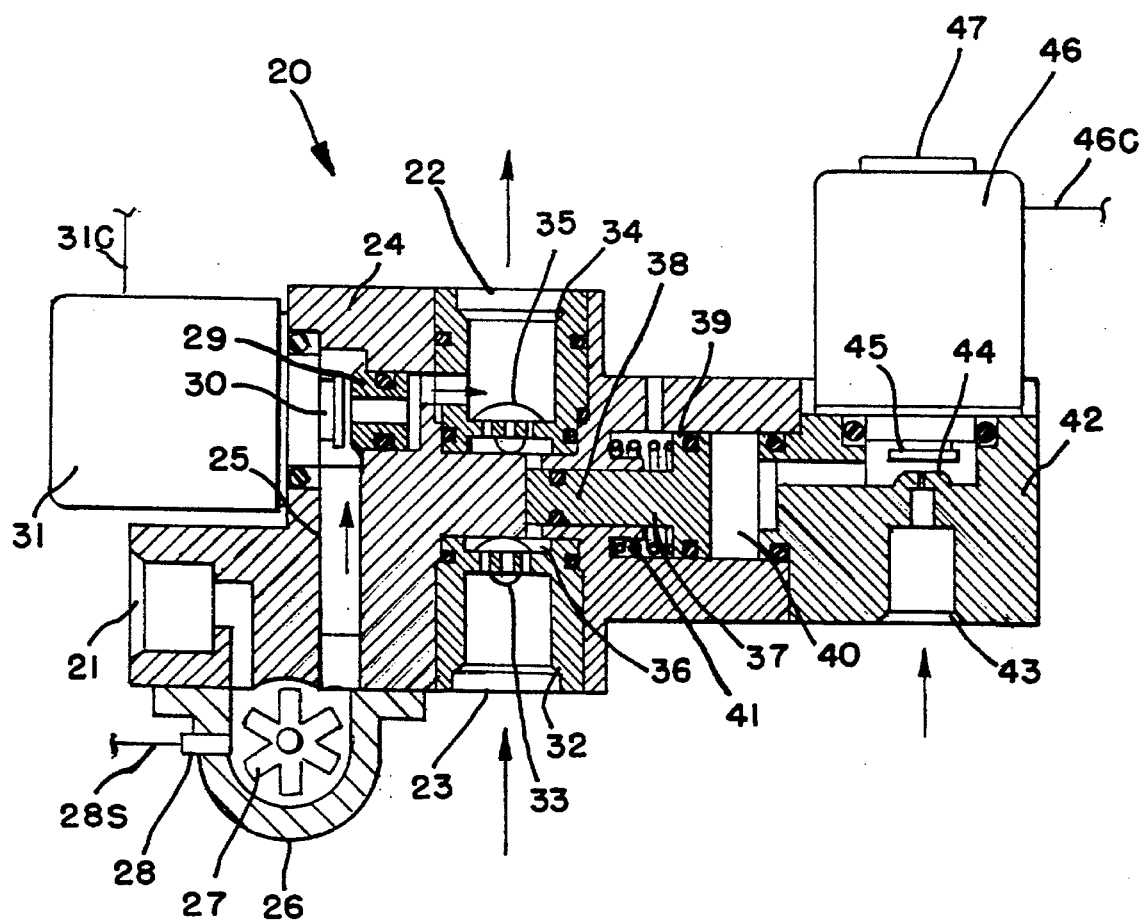
FIG. 2 is an illustration, partly in cross-section, of the treating module employed in the water treating apparatus of FIG. 1.

As illustrated in FIG. 2, the treating module includes a water flow passage 25 extending between water inlet 21 and water outlet 22. Disposed in passage 25 is a water flow sensor which may, for example, comprise a paddle wheel 27 working within a housing 26. A flow sensor pickup 28 is fitted in the wall of housing 26. Also disposed in water flow passage 25 is a water valve including a valve seat 29 and a movable valve head 30 operated by a solenoid 31. The inlet 23 for the treating agent is formed in part by a mounting cup 32 fitted with a one-way valve 33. Similarly, the water outlet 22 is formed in part by a mounting cup 34 fitted with a one-way valve 35. Elastomeric one-way valves are suggested by the drawings, but other types of one-way valves could be used instead. A flow passage 36 for disinfectant extends between the two one-way valves and accommodates the end of stem 38 of a movable pump element which forms, with the two one-way valves, a variable volume pump chamber of a disinfectant injector pump. The head 39 of the movable pump element fits with a sliding seal within an actuator chamber 40. A spring 41 biases the movable pump element from the extended position shown to a (not shown) retracted position. A pressurized actuating fluid, such as $CO_2$ gas, for driving the movable pump element is supplied through inlet port 43 formed in a block 42 fitted to the treating module body 24. A three-way valve assembly including a valve seat 44 a movable valve head 45 and a solenoid 46 controls the admission of actuating fluid through inlet port 43 into the actuator chamber 40. This valve assembly also controls the exhaust of actuating fluid from the actuator chamber through an exhaust port 47.

Referring again to FIG. 1, a signal conductor 63S connects the level sensor to a controller 90, and a signal conductor 28S connects the flow sensor pickup 28 to the controller. Control conductors 31C, 46C and 84C connect the controller to solenoids 31 and 46 on the treating module and solenoid valve 84 in $CO_2$ conduit 82, respectively.

Pressurized fluid for driving the pump in the treating module is supplied to the inlet port 43 in the treating module through conduit 81. The fluid exhausted through port 47 may be released to the atmosphere. Alternatively, as shown in phantom, this fluid may be routed via conduit 48 into conduit 82 supplying $CO_2$ gas to the bubbler in the holding vessel 55. To inhibit high pressure $CO_2$ pulses, conduit 48 may incorporate a restrictor 48R.

In operation of the water treating apparatus, water introduced into the treating module through water inlet 21 and flowing through passage 25 drives the paddle wheel 27 of the flow sensor. For each volume increment of water flow, sensor pickup 28 generates a signal which is fed to controller 90 through conductor 28S. The controller, which may be a readily available microprocessor, counts the signals from the flow sensor and develops a control signal for each predetermined number of counted signals. The control signal is fed through conductor 46C to energize solenoid 46C which causes opening of valve 44, 45 to admit pressurized fluid to the actuating chamber 40 for the disinfectant pump in the treating module. The pressurized fluid drives the movable pump element to its extended position to expel a measured amount of disinfectant from the pump chamber through one-way valve 35 and into water flowing through the downstream region of the water flow passage 25. Solenoid is then deenergized, which causes closing of the valve 44, 45 and opening of exhaust port 47. As pressure is relieved from the actuating chamber 40, spring 41 effects movement of the movable pump element to its retracted position and a refilling of the disinfectant pump chamber through one-way valve 33.

The predetermined number of flow sensor signals counted by controller 90, and the output volume of the disinfectant pump are selected to achieve a desired concentration of disinfectant in the water discharged from the treating module and fed to the holding vessel. A concentration of sodium hypochlorite which has been found effective for treating water supplied to a post-mix beverage dispenser is approximately 2.5 to 3 ppm.

Controller 90 also maintains a count of the total number of signals issued by the flow sensor, and activates an alert signalling the need to replace the filtration media in filters 15 and 75 when the count total reaches a predetermined magnitude.

Controller 90 coordinates the addition of gaseous $CO_2$ to the water in holding vessel 55 and the addition of disinfectant to the water flowing through the treating module. Along with the control signal sent via conductor 46C to operate the disinfectant injector pump, the controller sends another control signal via conductor 84C to solenoid valve 84 in conduit 82 to open the valve and admit $CO_2$ gas to the bubbler.

Controller 90 also processes signals from the level sensor 63 to effect level control of the water in the holding vessel 55. In response to a signal from the longer of the level probes, the controller issues a control signal via conductor 31C open the water valve 29, 30 in the water flow passage 25 of the treating module and permit the water to flow into the holding vessel. A control signal to solenoid 31 to close water valve 29, 30 and terminate flow from the treating module to the holding vessel issues in response to a signal from the shorter of the level probes.

Figure 3:
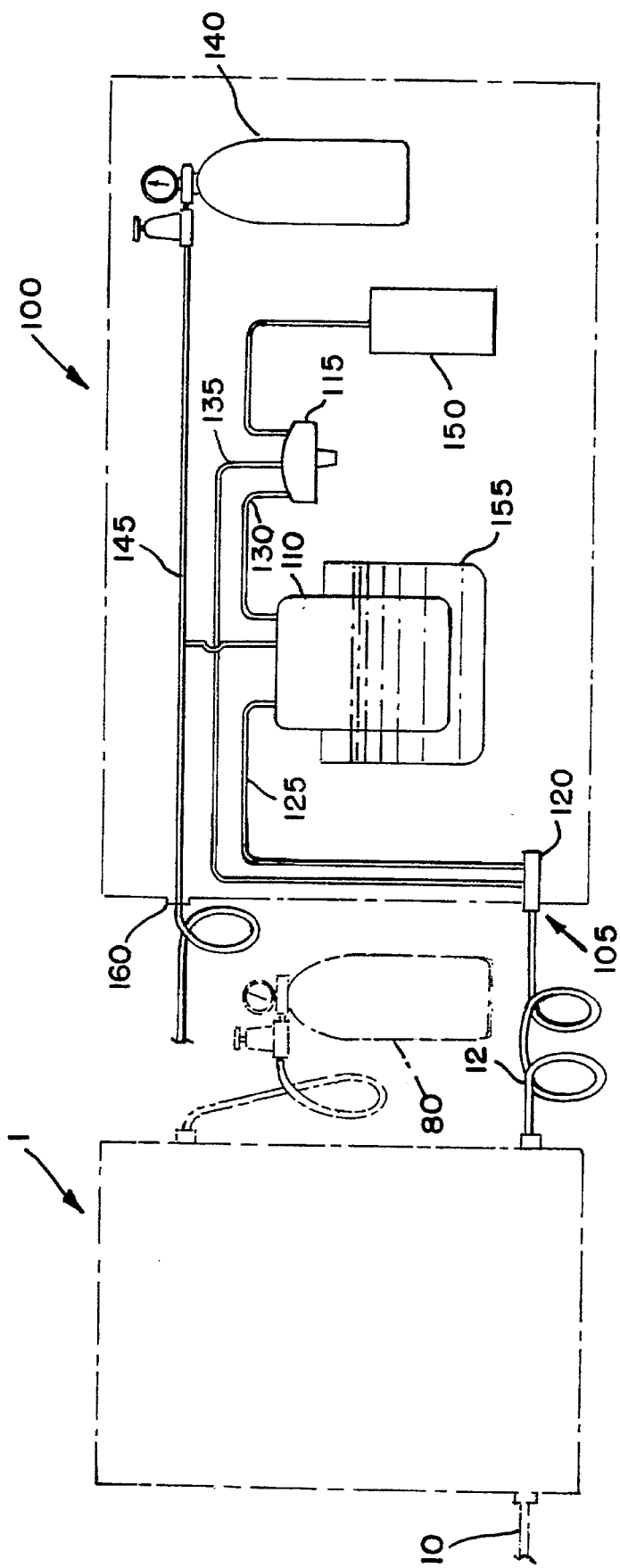
FIG. 3 is a schematic illustration of the water treating apparatus of the present invention coupled to a post-mix beverage dispenser.

As illustrated schematically in FIG. 3, outlet conduit 12 of water treating apparatus 1 is coupled to the water inlet 105 of a post-mix beverage dispenser 105. The dispenser shown incorporates a splitter 120 which directs treated water through conduit 125 to the inlet of a carbonator vessel 155 and through conduit 135 to a mixing and dispensing valve 115. Soda water flows from the carbonator vessel through a conduit 130 to the mixing and dispensing nozzle. A beverage syrup supply is indicated by 150. Bottle 140 provides a convenient source of $CO_2$ gas at regulated pressure and is coupled by conduit 145 to the carbonator vessel. As shown, conduit 140 may also extend to an accessible fitting provided on the beverage dispenser. Typically the carbonator vessel is exposed to a chilling medium, suggested by water bath 155, and an elevated pressure is maintained within the vessel. As shown in phantom, and as shown in FIG. 1, bottle 80 may serve as a source of pressurized $CO_2$ gas. Alternatively, the $CO_2$ bottle 140 in the beverage dispenser may supply pressurized CO2 gas to the water treating apparatus, as suggested by the flexible conduit connected to fitting 160.

What is claimed is:

1. A water treating apparatus comprising:
   a treating module incorporating a water supply port, a water discharge port, a first flow passage extending between the water supply port and the water outlet port, a flow sensor and a valve disposed in the first flow passage, a treating agent inlet, a second flow passage extending between the treating agent inlet and the first flow passage and a pump for moving a treating agent supplied to the treating agent inlet through the second passage into the first passage;
   a holding vessel incorporating a water inlet coupled to the water outlet port of the treating module, a water outlet and a water level sensor; and
   control means for (1) operating the pump in response to signals generated by the flow sensor and (2) operating the valve in response to signals generated by the water level sensor.

2. The water treating apparatus as recited in claim 1 wherein a chlorine disinfectant is employed as the treating agent, and the holding vessel also incorporates a $CO_2$ inlet for admitting gaseous $CO_2$ to be mixed with water in the holding vessel.

3. The water treating apparatus as recited in claim 2 wherein the control means also controls the admission of gaseous $CO_2$ to the holding vessel in response to signals generated by the flow sensor.

4. The water treating apparatus as recited in claim 2 wherein:
   the treating module also incorporates a gas inlet port for admission of a pressurized gas;
   the pump includes a movable pump element driven by a pressurized gas introduced through the gas inlet port; and
   the control means operates the pump by controlling the application of pressurized gas to the movable pump element.

5. The water treating apparatus as recited in claim 4 wherein a pressurized $CO_2$ reservoir is coupled to the $CO_2$ inlet of the holding vessel and the gas inlet port of the treating module.

6. The water treating apparatus as recited in claim 5 wherein the treating module also incorporates a gas outlet port for exhausting gas applied to the movable pump element, the gas outlet port being coupled to the $CO_2$ inlet of the holding vessel.

7. The water treating apparatus as recited in claim 1, further comprising a carbonating vessel provided with a water inlet coupled to the water outlet of the holding vessel.

8. The water treating apparatus as recited in claim 7 wherein the interior of the holding vessel is maintained at a first pressure, and the interior of the carbonating vessel is maintained at a second pressure which is different from the first pressure.

9. The water treating apparatus as recited in claim 8 wherein the first pressure is ambient pressure, and the second pressure is greater than ambient pressure.

10. The water treating apparatus as recited in claim 9 wherein the holding vessel is exposed to ambient temperature, and the carbonating vessel is exposed to a chilling medium.

11. The water treating apparatus as recited in claim 10 wherein the carbonating vessel is incorporated into a post-mix beverage dispenser.

12. The water treating apparatus as recited in claim 1, further comprising at least one filter coupled to the water supply port of the treating module and to the water outlet of the holding vessel.

13. The water treating apparatus as recited in claim 12 wherein the control means also operates an alert signalling the need for replacement of filtration media in the filters in response to signals generated by the flow sensor.

14. In combination with a post-mix beverage dispenser equipped with a water inlet and a carbonating vessel coupled to the water inlet, the carbonating vessel adapted to hold carbonated water at a pressure which is greater than ambient pressure and being exposed to a chilling medium, the improvement comprising:
   a water treating apparatus coupled to the water inlet, the water treating apparatus incorporating a holding vessel for receiving and mixing water and gaseous $CO_2$ and holding the mixture of water and $CO_2$ at ambient pressure, the holding vessel being exposed to ambient temperature.

15. The combination recited in claim 14 wherein the improvement further comprises a mixing device for mixing a chlorine disinfectant and water, the mixing device including an outlet for delivering water mixed with chlorine disinfectant to an inlet of the holding vessel.

16. A method of preparing water for human consumption as a potable liquid or as a component of a beverage formed from a mixture of the prepared water and a beverage syrup, the method comprising the steps of:

adding a disinfectant to water flowing into a first vessel maintained at ambient internal pressure and exposed to ambient temperature;

mixing gaseous $CO_2$ with the water in the first vessel;

conducting the water in the first vessel to a second vessel maintained at greater than ambient internal pressure and exposed to a chilling medium; and mixing gaseous $CO_2$ with the water in the second vessel.

17. The method recited in claim 16, further comprising the step of conducting the water through a filtration medium constructed to trap micro-organisms during the passage of the water from the first vessel to the second vessel.

18. The method recited in claim 17, further comprising the step of conducting the water through an activated carbon filtration medium constructed to reduce residual disinfectant concentration as well as objectionable tastes and odors during the passage of the water from the first vessel to the second vessel.

19. A method of preparing and supplying water to a mixing and dispensing nozzle in a post-mix beverage dispenser, the method comprising the steps of:

mixing gaseous $CO_2$ with water in a first vessel maintained at ambient internal pressure and exposed to ambient temperature;

conducting the water from the first vessel to a second vessel maintained at greater than ambient internal pressure and exposed to a chilling medium;

mixing gaseous $CO_2$ with the water in the second vessel; and conducting the water in the second vessel to the mixing and dispensing nozzle.

20. The method recited in claim 19 wherein the first vessel is exposed to ambient temperature, and the second vessel is exposed to a chilling medium.

* * * * *